J. FRANKLIN.
FORAGE CURING DEVICE.
APPLICATION FILED JAN. 26, 1914.
1,148,894.
Patented Aug. 3, 1915.
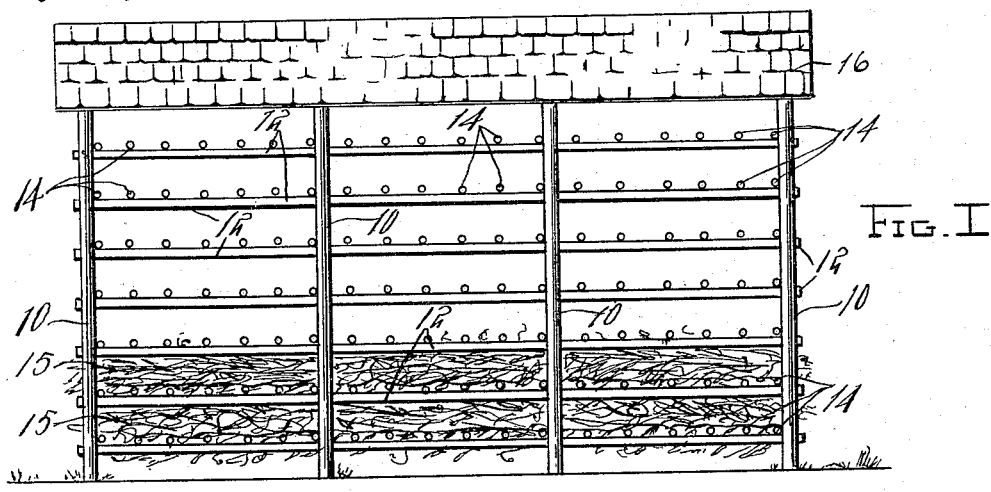
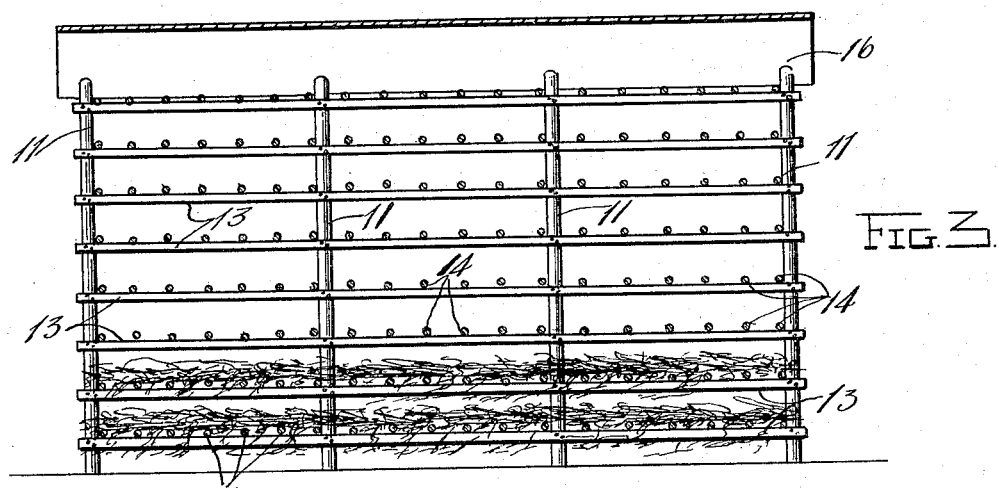
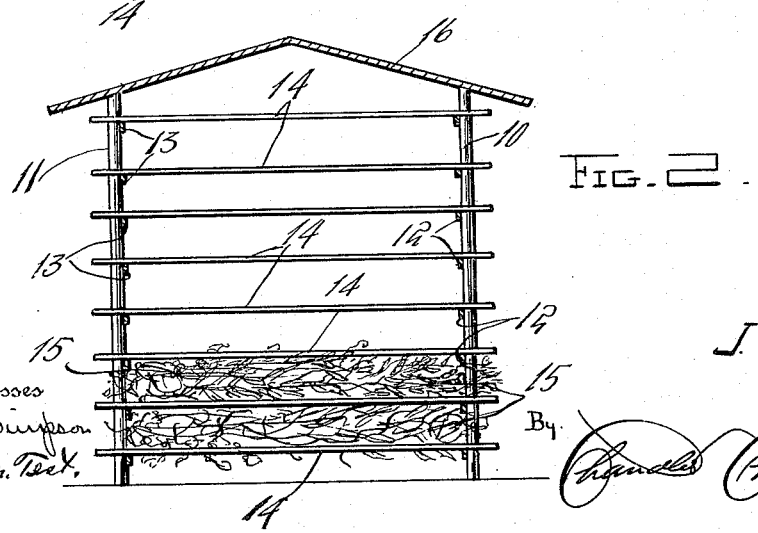

UNITED STATES PATENT OFFICE.

JOSHUA FRANKLIN, OF PYRITON, ALABAMA.

FORAGE-CURING DEVICE.

1,148,894. Specification of Letters Patent. Patented Aug. 3, 1915.

Application filed January 26, 1914. Serial No. 814,454.

*To all whom it may concern:*

Be it known that I, JOSHUA FRANKLIN, a citizen of the United States, residing at Pyriton, in the county of Clay, State of Alabama, have invented certain new and useful Improvements in Forage-Curing Devices; and I do hereby declare the following to be a full, clear, and exact description of the invention, such as will enable others skilled in the art to which it appertains to make and use the same.

This invention relates to improvements in curing devices and processes, and particularly to devices and processes for curing forage plants.

The principal object of the invention is to provide a novel construction of device in which the forage plants can be stored under shelter, and receive the proper circulation of air to all parts of the mass.

Other objects and advantages will be apparent from the following description, when taken in connection with the accompanying drawings.

In the drawings: Figure 1 is a side elevation of the device. Fig. 2 is a vertical transverse sectional view therethrough. Fig. 3 is a vertical longitudinal sectional view therethrough.

In the southern part of the United States, the best and most available plants for use in feeding stock during the winter months are peas and soy beans, and some other plants which have thick sappy stems or thick pods. These stems and pods are very hard to dry and unless they be fully cured before storing in bulk, they render the whole mass soggy or moldy or heated, and thereby damaged or even unfit for stock food. If they are exposed to the weather in the usual way of curing hay, even in fine weather long enough to dry the stems and pods, the leaves will dry too much, and crumble or break off the stems and thus be lost. In rainy weather, these plants are often rendered valueless for feeding purposes.

In the northern parts of the United States lying eastward from Colorado, and also in the State of Washington, westward from the Cascade Mountains, there is danger of rainy weather at hay harvest time, and consequent risk of damage to mown fodder plants before they are cured sufficiently to store in bulk. Plants with thick stems require at least a week to cure in the South. In the North the grasses, clover and alfalfa need about two or three days to dry, and on the Pacific slope of the State of Washington a much longer time is required owing to the humidity of the atmosphere.

It is the object of this invention to devise a means and a process for curing forage plants with all the good qualities of the original plants unimpaired and it provides a means whereby plenty of air is permitted to circulate through all parts of the mass of stored forage plants while protected from the weather by a roof. In this way, they are thereby cured slowly but thoroughly without risk of rain, dew, sun or sweating and heating or molding. In fact it is the only feasible means of curing plants like cow peas without injury to or total loss of leaves, which are the most valuable part of such plants. By the simple and inexpensive means provided by this invention, the mass of forage plants under shelter in bulk, is held apart at all points sufficiently to permit the air to flow and circulate through it. Were these plants stored in bulk, without this device, they would consolidate into a compact air excluding mass and be ruined by heating or molding.

Specifically speaking and referring particularly to the drawing, my invention consists in driving two or more parallel rows of suitable posts 10 and 11 of convenient height and securing longitudinally to the inner faces of the posts a plurality of parallel suitably spaced slats 12 and 13. A number of poles or equivalent devices 14 are inserted between the lowermost slats and extended from one set of slats to the set on the opposite posts, these poles being spaced the desired distances apart. On these poles are heaped and then spread the forage plants 15 to be cured. Should the forage be very green, the layer will be spread more or less thinly, but if the forage has become partially dry, they may be packed more thickly on the poles. After one layer has been properly spread on the poles, a second set of poles are disposed between the next slats above, in a manner similar to the ones just described, and at a distance above the first poles according to the depth of the first layer of vines. A second layer of forage plants is laid on the second set of poles and so on to the tops of the posts. A suitable roof 16 is mounted on the tops of the posts to protect the material from the direct rays of the sun and from rain. The poles are spaced sufficient distances above the next lower layer of forage plants to permit air to pass between the poles and the top of the said next lower layer. After several days the forage plants will settle so that the air spaces between the vines and the poles above will be increased thus providing for a thorough circulation of air over and under each layer of forage also through these layers because they lie loosely and openly as they receive no pressure from above to pack them, with the result that the forage cures slowly, evenly and thoroughly, with the green color, good taste and the nutriment of the original plants intact.

Referring particularly to the drawing, 10 and 11 represent respectively the posts of two series which are arranged in parallel relation. Secured to these posts, in the manner hereinbefore described, are the slats or strips 12 and 13. The transverse poles which extend from one series of slats to the other are indicated at 14, and on these poles are placed the layers 15 of plants. Secured on the upper ends of the posts 10 and 11 is the roof or cover 16.

From the foregoing, it will readily be seen that I have provided a simple and inexpensive device of great benefit to stock raisers and farmers by means of which the plants used for forage can be effectively cured in good order almost regardless of weather with all the good qualities of the original plants unimpaired.

As the forage plants become cured and the layers settled, the air spaces between the layers will be greatly increased. The farmer can increase the bulk of material by removing some of the poles at the bottom so that the cured layers will drop into a single mass. The poles can then be placed in above this mass and more forage plants placed thereon. This operation can be repeated until the mass of forage plants reaches up to the roof. It will of course, be understood that the number of posts in the rows can be increased, or more rows of posts can be provided so as to increase the size of the barrack and accommodate the forage plants.

Curing forage plants by this method saves considerable labor and expense by obviating the necessity for tedding and shocking.

What is claimed is:—

In a device for curing forage, the combination with a frame consisting of a pair of spaced sides including vertical posts and horizontal slats connecting the same and arranged in spaced relation, of superposed spaced open floors extending from one side of the frame to the other and including a plurality of spaced poles removably mounted on the said slats.

In testimony whereof, I affix my signature, in the presence of two witnesses.

JOSHUA FRANKLIN.

Witnesses:
  CLEVELAND W. ALLEN,
  JOHN T. TREADWELL.

Copies of this patent may be obtained for five cents each, by addressing the "Commissioner of Patents, Washington, D. C."